(12) United States Patent
Chen et al.

(10) Patent No.: US 6,755,874 B2
(45) Date of Patent: Jun. 29, 2004

(54) PLATE MAKING PROCESS FOR LEAD ACID BATTERY

(75) Inventors: Rongrong Chen, Fishers, IN (US); Shay Harrison, East Greenbush, NY (US); Wellington Y. Kwok, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 606 days.

(21) Appl. No.: 09/758,654

(22) Filed: Jan. 11, 2001

(65) Prior Publication Data

US 2002/0124388 A1 Sep. 12, 2002

(51) Int. Cl.[7] .............................................. H01M 4/21
(52) U.S. Cl. ...................... 29/623.5; 141/1.1; 429/217; 429/228
(58) Field of Search ........................... 141/1.1; 429/217, 429/228; 29/623.5

(56) References Cited

U.S. PATENT DOCUMENTS

| | | | |
|---|---|---|---|
| 4,315,829 A | * 2/1982 | Duddy et al. | 429/217 X |
| 5,273,554 A | 12/1993 | Vyas | 29/623.5 |
| 5,660,600 A | 8/1997 | Vyas | 29/623.5 |
| 5,952,123 A | * 9/1999 | Hatanaka et al. | 429/217 |

FOREIGN PATENT DOCUMENTS

| | | | |
|---|---|---|---|
| JP | 55-46267 | * | 3/1980 |
| JP | 2001-229920 | * | 8/2001 |

* cited by examiner

Primary Examiner—John S. Maples
(74) Attorney, Agent, or Firm—Margaret A. Dobrowitsky

(57) ABSTRACT

A plate making process for a lead acid battery which eliminates the need for steaming and curing steps to produce the active material. Mixing, reacting and crystallizing occur in a closed reactor under controlled temperature and mixing conditions to produce a paste having the desired crystal morphology. A polymer is then added to the paste to bind the crystals together and to produce desired rheological properties in the paste. The paste having the polymer addition is then pasted onto a grid where the paste is dried to form a battery plate of the lead acid battery. The process is applicable for both the positive and negative plates of a lead acid battery.

36 Claims, 7 Drawing Sheets

PLATE MAKING PROCESS FOR LEAD ACID BATTERY

FIELD OF THE INVENTION

This invention relates to batteries, and more particularly to a plate making process for lead acid batteries.

BACKGROUND OF THE INVENTION

Lead acid batteries are the oldest and best-known energy devices in automobile applications. A common process to manufacture flat pasted plate lead acid batteries is shown schematically in FIG. 1. Pure lead 10 is converted in step 20 to a 70–80% oxidized lead powder (lead oxide or leady oxide) in a Barton pot or a ball mill with a range of grain size distribution. For the positive paste, the mixing step 30 includes placing the dry lead oxide powder from step 20 in a positive mixing machine, such as a 3000 pound paste mixer, and mixing it with water 40 and $H_2SO_4$ 50 under constant stirring and at an elevated temperature. For the negative paste, mixing step 60 includes placing the dry lead oxide powder from step 20 in a negative mixing machine, such as a 3000 pound paste mixer, and mixing it with water 40, $H_2SO_4$ 50 and an expander 70 under constant stirring at ambient temperature. The pastes formed from mixing steps 30 and 60, depending on the ratio of starting materials, the rate of mixing and the temperature, contain mixtures of the initial powders, lead sulfate, and basic lead sulfates such as $PbOPbSO_4$ (monobasic lead sulfate), $3PbOPbSO_4 \cdot H_2O$ (tribasic lead sulfate), and $4PbOPbSO_4$ (tetrabasic lead sulfate).

After a period of mixing, the pasting step 80 includes pressing the respective pastes on the expanded grids by a specially designed machine to prepare the positive and negative plates. To prevent sticking of the plates, the positive and negative plates are surface dried in an oven prior to stacking them on the skids, as indicated at steps 90,100 respectively. To improve the active material/grid contact and the mechanical strength of the active material, the skids with positive plates from step 90 are subjected to a steaming and curing process 110, which includes transporting the positive plates to a steam chamber for several hours and then to a curing room for about 3–4 days. During steaming and curing 110, further reaction of the ingredients occurs, resulting in a different ratio of the lead oxides, sulfate and basic lead sulfates. The resulting cured material is a precursor to lead dioxide, which forms the active material in the plates.

After curing is complete, the plates from steps 115 and 110 are transported to assembly 120 and the battery formed. The formation step 130 includes electrochemically oxidizing the precursor material for the positive electrode to lead dioxide and for the negative electrode to sponge lead, typically by adding sulfuric acid into the assembled cells. The finishing step, also 130, includes dumping the forming acid, refilling the batteries with the shipping acid, and sealing the batteries with a final cover. The whole process of making a single battery may take at least 6–7 days. In batch-and-queue production, the process more commonly takes 3–4 weeks.

During the plate drying process, both the cross-section of the pores and the volume of the paste are decreased, leading to paste shrinkage. In some cases, the shrinkage of the paste is so extensive that cracks may occur, or the paste may even become detached from the grid. The cracks disrupt the electrical path in the plate and hinder the formation of the active materials. To eliminate paste cracking, it is critical to employ adequate drying conditions.

During the steaming and curing processes, several chemical reactions occur, including oxidation of residual lead, recrystallization of basic lead sulfate, paste drying and grid corrosion. The best bonding strength between the crystals of the paste, i.e. cohesion strength, and between the paste and the grid, i.e. adhesion strength, is obtained at the end of curing. Several factors, such as moisture content in the paste, structure of the active material crystals, and structure of the corrosion layer may affect the cohesion and adhesion strength of the plates. Due to long production time and stacking arrangement of the plates, it has become a challenge to produce crack-free strong plates with well-controlled quality, such as consistent paste density, porosity, crystal morphology and amount of active material pasted.

Some efforts at improving lead acid batteries have focused upon the precursor material. For example, U.S. Pat. No. 5,660,600 is designed to optimize the size and structure of tetrabasic lead sulfate crystals, which have a large impact upon the formation of the active material in the positive plate and the mechanical strength and cycling life of the positive plates. Tetrabasic lead sulfate crystallizes as large elongated prismatic (needle shape) crystals, but their formation is inefficient and their utilization (capacity per gram of active material) is lower than other oxides. In U.S. Pat. No. 5,660,600, reaction temperature and curing temperature are controlled to produce a uniform prismatic size of tetrabasic lead sulfate crystals purportedly having average width dimensions in the range of 1–2 $\mu$m, thereby allowing rapid conversion to lead dioxide. In practice, however, the teachings of U.S. Pat. No. 5,660,600 result in a paste that is far too brittle to be useful.

Another approach at improving lead acid batteries is to eliminate the steaming and curing steps to provide a process that is less costly and time-consuming than the traditional process depicted in FIG. 1. To make cureless plates that have similar or better quality than traditional cured plates for lead acid batteries is an extremely challenging endeavor. One recently developed method for making cureless plates, disclosed in copending U.S. Pat. application Ser. No. 09/304, 877, can be characterized in that the paste mixing, reacting and crystal forming steps occur in an extrusion or a high-shear continuous processing apparatus. The paste from the extrusion apparatus is extruded into the grid mesh, where the paste is dried to form a battery plate of the lead-acid battery. The extruding step can be performed as a sheathing process, a roll-forming process, a tape-casting process, or an injection molding process. For this cureless continuous paste making process to work, basic sulfate crystals with the desired crystal structure must be producible in the extrusion apparatus, and the extruded paste must produce crack-free plates with strong active material cohesion and grid/active material adhesion. Other cureless paste processes for lead acid batteries emphasized using lead sulfate as a starting material. This method, however, resulted in poor active material cohesion and poor grid/active material interface adhesion for the cureless plates. Moreover, formation efficiency and electrical performance of the batteries were poor. Finally, lead sulfate as a starting material increases cost.

There is thus a need to develop a method to produce a paste with the desired crystal structures from a relatively low cost starting material. There is further a need to bind the crystals such that the paste mixture exhibits the desired rheological properties for pasting onto the battery grids to produce crack-free plates with strong cohesion and adhesion. Such method should eliminate steaming and curing steps that significantly add to the cost and time of the battery production.

SUMMARY OF THE INVENTION

The present invention provides a plate making process for a lead acid battery which eliminates the need for steaming and curing steps to produce the active material. To this end, and in accordance with the present invention, a paste having a desired crystal morphology is produced in a closed reactor by mixing and reacting an oxidized lead powder, water and sulfuric acid under controlled temperature and mixing conditions. A polymer is then added to the paste to bind the crystals together and to produce desired rheological properties in the paste. In one example of the present invention, a surfactant may also be added to the paste. The paste having the polymer addition is then pasted onto a grid where the paste is dried to form a battery plate of the lead acid battery. This process may be used to form both the positive and negative plates for a lead acid battery. The process produces crack-free plates with strong cohesion and adhesion, high performance and long cycling lives. Moreover, batteries incorporating the plates of the present invention exhibit good electrical performance and durability by using an active material with optimized crystal morphology.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
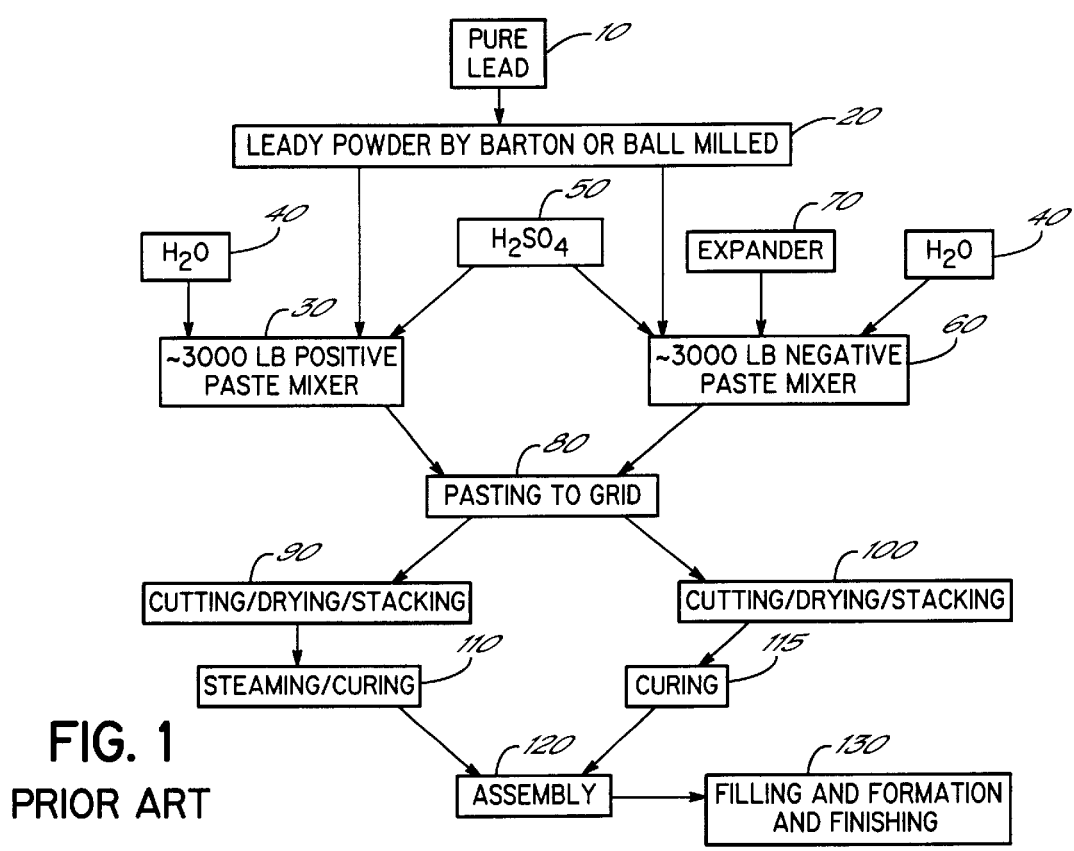
FIG. 1 is a flow diagram of the conventional method of manufacturing lead acid batteries using flat pasted plates.

The present invention provides a manufacturing process for lead acid batteries that produces strong plates without steaming and curing steps. The plates have better performance and longer cycling life than plates produced by current technology. To this end, and in accordance with the present invention, the desired morphology of the active material crystals is formed directly during paste mixing. Alternatively, a paste with desired crystal structures may be obtained commercially and stored until ready for use. Polymers are then added to the paste to bind the inorganic crystals together to form a paste mixture having desired rheological properties. This mixture can be readily extruded and/or rolled onto the grid to produce the battery plates. The plates having the polymeric addition in the paste mixture are stronger and harder than conventionally produced plates. The polymer addition further minimizes the cracks that are commonly generated during pasting, drying, steaming or curing during conventional plate manufacturing processes. By eliminating the steaming and curing steps, and by improving the rheological properties of the paste mixture such that it can be pasted onto the grids without plate cracking, cureless continuous plate making processes are made commercially feasible with a dramatic reduction in manufacturing cost and time. By this process, the quality of the battery plates can be better controlled and made more consistent than with current technology. Moreover, the electrical performance and durability of the batteries are improved by using an active material with optimized crystal morphology. The various embodiments of the present invention will further provide flexibility to manufacture different models of batteries with improved performance.

The main reason for past use of the steaming and curing processes was to form the needle shape tetrabasic lead sulfate crystals in the positive plate for the mechanical strength and cycling life of the positive plates. The dimensions of the needle crystals have been found to be critical for performance and cycling life of the batteries. With big needle crystals, the inactive tetrabasic sulfate residual phase inside the needle crystals can cause capacity loss of the active materials. For thin needle crystals, the needle structure may not withstand charge and discharge cycling applications. It is now known that needle crystals having a width around 3 $\mu$m are considered to be the best for optimized performance and cycling capacity of positive active materials for lead acid batteries.

The plate making process of the present invention uses the same starting material as in conventional processes, specifically mixtures of lead oxide. Thus, the present invention maintains a low starting material cost. By way of example, the starting material may include various forms of lead oxide, such as orthorhombic lead oxide, tetragonal lead oxide, red lead and leady oxide, which is a combination of lead oxide and elemental lead. By mixing water with the lead oxide mixture, then adding sulfuric acid in a closed paste mixer with well-controlled reactor temperature, a paste with the preferred crystal structures can be synthesized reproducibly. The particle size of the active material is both optimized and reproducible by mixing, reacting and crystal forming within a closed paste reactor. The formation efficiency and electrical performance of the batteries are improved by the small crystals, which provide high reaction surface area. One example of a closed paste mixer usable in the present invention is that disclosed and described in copending U.S. Pat. application Ser. No. 09/304,877 entitled CONTINUOUS PASTE MAKING PROCESS FOR LEAD ACID BATTERY, incorporated by reference herein in its entirety. Because the mixing, reacting and crystallizing take place in a closed reactor with high intensity mixing, the heat energy generated by mixing and reacting the starting materials is retained and utilized to complete the microstructural growth of the active material. Another example of a closed paste mixer or reactor would be any mixing unit modified to include a double walled jacket or other structure that allows for heating or cooling during the paste mixing process. Within the doubled walled structure may be any appropriate heating or cooling medium, such as water, heating oil or a coolant.

The present invention adds a polymeric material to the crystallized paste. The organic surfaces of the polymer regulate the nucleation, growth, morphology and orientation of the inorganic crystals. While in conventional processing, free lead is converted to lead oxide or basic lead sulfate crystals in the curing step, and the oxide then connects the crystals in the paste to function as the binder for providing cohesion of the active material crystals, the present invention uses the polymers as the binders for binding the crystal active materials together and for binding the active material onto the grid surface. The green plates produced from the synthesized tetrabasic lead sulfate paste with the polymer addition are expected to be as strong as those produced through steaming and curing processes. The electrical performance and cycling capacity of the batteries using the plates with optimized consistent crystal morphology are further expected to be better than those using conventional cured plates.

Selection of an appropriate polymer for addition to the paste mixture includes consideration of the chemical resistance of the polymer to the sulfuric acid used to form the paste, the polymer's thermal stability at temperatures of 50° C. or higher, the polymer's forming micro-architecture with lead oxide particles, basic lead sulfate or lead sulfate crystals, the polymer's ability of absorption onto the lead grid surface, and the polymer's environmental safety and cost. Suitable polymers include hydrophobic polymers, such as polyolefins, polyvinylchlorides, polyacrylonitriles, and polyesters, as well as hydrophilic polymers, such as polyvinylpyrrolidone, polyacrylic acid, polyethylene oxide, polymaleic acid or polystyrenesulfonic acid.

Through the polymeric additions into the paste mixture, the cohesion strength of the paste crystals and the adhesion strength at the grid/active material interface is improved over conventional cured plates. The polymer chains in the paste make the plates more resistant to fractures during the plate manufacturing process, thus reducing crack formation. In addition to the advantage of making strong, crack-free plates, the polymer addition further acts as a corrosion inhibitor for the lead grid alloy and as a crystal modifier for the active materials.

A good ionic conductivity inside the plates is also important for high formation efficiency. In addition to adding polymers to bind the lead sulfate particles to generate the porous skeleton, surfactants may also be added. The surfactants reduce the surface tension of the produced dry paste and regulate the growth, morphology and orientation of active material crystals. Several types of surfactants have been used in traditional negative plates to achieve high reaction surface area of the negative active materials. Lignosulfonates composed of hydrophilic and hydrophobic portions in the polymeric chains are suitable for use in both the positive and negative plates. By using the polymers to build a strong porous skeleton and using the surfactants to reduce the surface tension of the dry paste, the acid diffusion process inside the positive plates is significantly improved. Thus, the present invention provides high formation efficiency in the final production step and good power and energy capabilities for the produced lead acid batteries.

In another embodiment of the present invention, a high sulfate content paste is used to improve the formation efficiency. This high sulfate content paste, containing about 15–50% sulfate, resembles pickled plates or discharged plates in their manner of formation. A high amount of lead sulfate may be produced on the surface of well-developed basic lead sulfate crystals. By using high sulfate paste, the micro-porosity inside the formed plates may be increased due to the volume changes from the lead sulfate to the lead dioxide or lead crystals. This high micro-porosity is essential for the high power capacity of the batteries. Because lead sulfate is an electric insulator, the plates with high sulfate content may have poor electric conductivity at the beginning of formation. An oxide containing 10–20% red lead ($2PbO.PbO_2$) is suggested for use in the preparation of high sulfate content pastes. Due to the good conductivity of the $PbO_2$ in the positive paste, the plates containing high sulfate may still be formed efficiently. Further, the cureless plates having the polymer addition and the high sulfate content will have better acid diffusion characteristics and higher formation efficiency than conventional cured plates.

Figure 2:
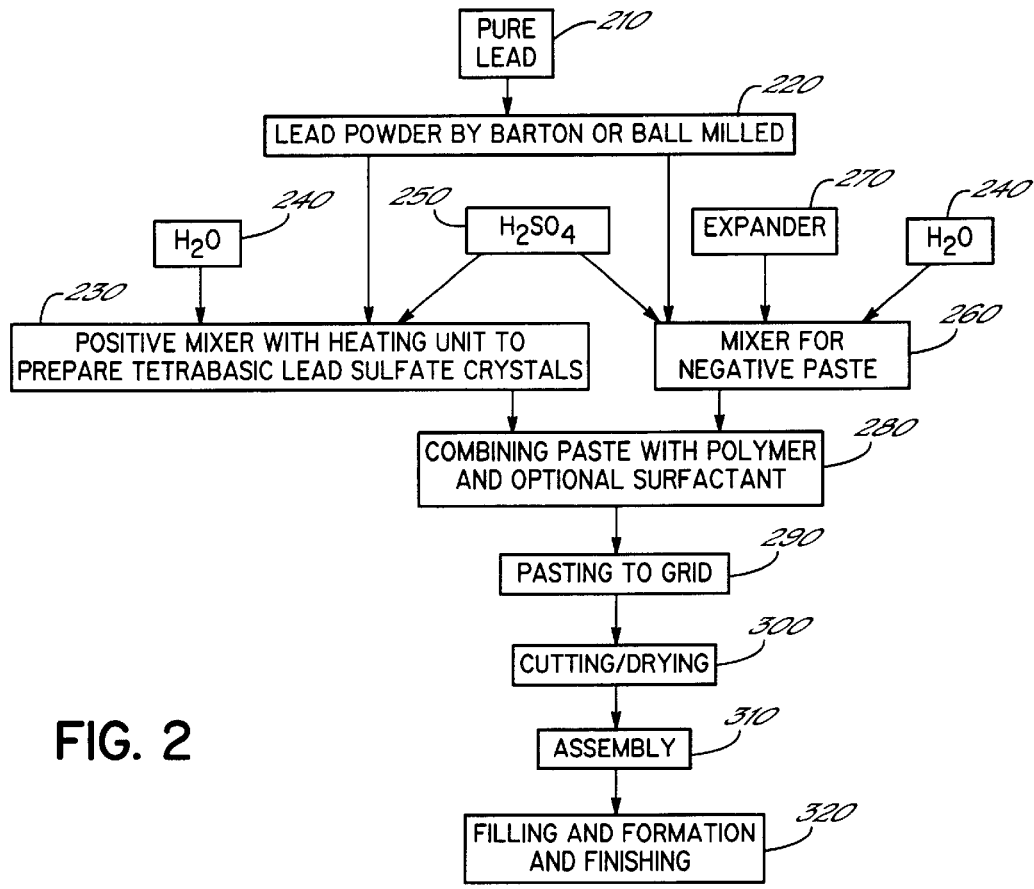
FIG. 2 is a flow diagram of one embodiment of the present invention for continuous plate making for lead acid batteries.

FIG. 2 presents a flow diagram of the production of cureless plates with the polymer addition. The starting material, in this process pure lead 210 is substantially converted in step 220 to an oxidized lead powder in a Barton pot or a ball mill, as with the process of FIG. 1. For the positive paste of the present invention, the mixing/reacting/crystal forming step 230 includes placing the lead oxide powder from step 220 in a positive mixer having a heating unit, and combining it with water 240 and sulfuric acid 250 to prepare the tetrabasic lead sulfate crystals. In one embodiment of the present invention, step 230 occurs at an elevated temperature of at least about 70° C., for example in the range of about 70°–150° C., and by way of further example about 90° C. For optimum battery performance, the tetrabasic lead sulfate crystals are formed with an average width of about 2–4 $\mu$m. For the negative plate paste of the present invention, the mixing/reacting/crystal forming step 260 includes placing the lead oxide powder from step 220 in a negative mixer and combining it with water 240, sulfuric acid 250 and expander 270 (including, for example, carbon black, $BaSO_4$, and lignosulfonate, namely Vanisperse A) to prepare tribasic lead sulfate crystals. In one embodiment of the present invention, step 260 occurs at a temperature between ambient and about 80° C., for example in the range of room temperature to 55° C.

Each of these pastes is then separately combined or coated in step 280 with a polymer and optionally a surfactant for improved rheological properties. Where, for example, an extrusion-type apparatus is used as described in Ser. No. 09/304,877, step 280 provides the desired rheological properties that enable easy extrusion of the paste material. The respective pastes are then pasted onto the grid in step 290. Pasting from the extrusion-type apparatus may be a sheathing process, a roll-forming process, a tape-casting process or an injection molding process, for example. Alternatively, a conventional pasting machine, well known to those skilled in the art, may be used.

To prevent sticking of the plates and to promote the cohesion of the active material particles and the adhesion of the active material to the grid surface, a drying step 300 is recommended to make the cureless plates. During the drying, water will vaporize and polymerization will occur in the paste, and slight positive grid oxidation may be observed. Because there is no need to pile the plates on the skids, pasting papers are not necessary, which will benefit the initial electrical performance of the batteries. After the plates are cut to the designed size and wrapped with the separators, green groups of the batteries can be assembled continuously in step 310, and formed and finished in step 320, as with steps 120 and 130 in FIG. 1. Using this process, batteries can be produced continuously in significantly less time than conventional processing, for example on the order of 3–4 days.

Figure 3:
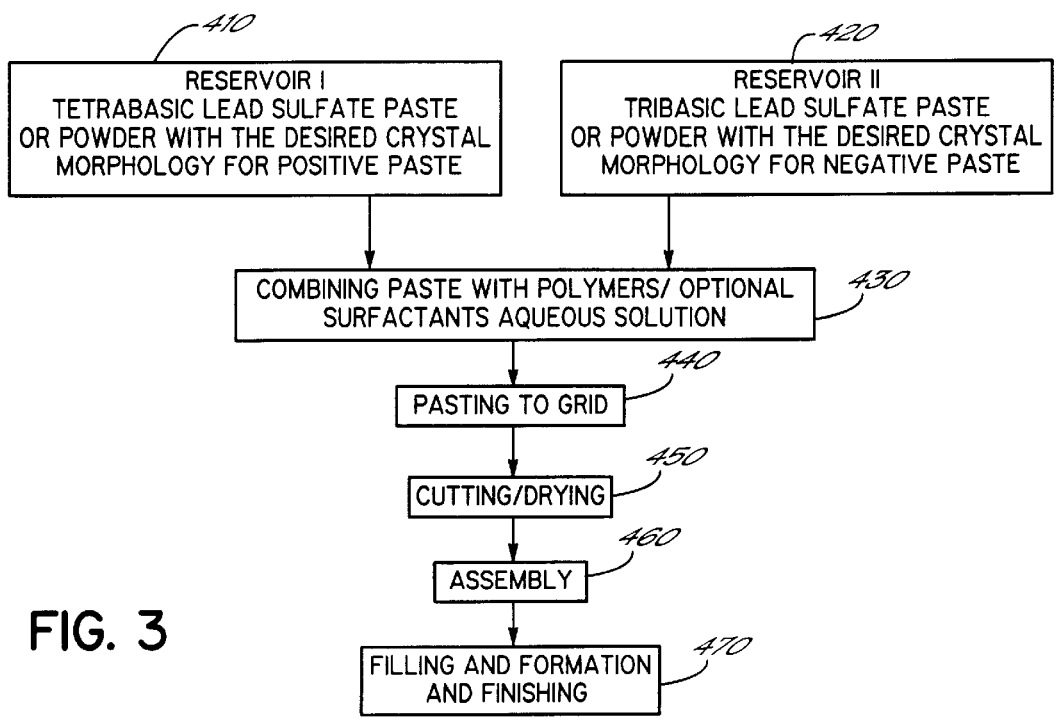
FIG. 3 is a flow diagram of another embodiment of the present invention of a plate making process for lead acid batteries.

To maximize productivity of the manufacturing process and flexibility of the product manufacturing, another embodiment of a plate making process of the present invention using basic lead sulfate reservoirs is proposed and described schematically in FIG. 3. Tetrabasic or tribasic lead sulfate mixes with the desired crystal morphology are either purchased or are synthesized in a closed reactor, and then reserved in a reservoir until ready for use. As shown, Reservoir I contains the tetrabasic lead sulfate positive plate paste 410 and Reservoir II contains the tribasic lead sulfate negative plate paste 420. The pastes from Reservoirs I and II are then each combined in step 430 with an aqueous solution of the polymer additive and optional surfactant to modify the rheological properties of the pastes and to bind the crystals of the paste together. According to design requirements, pastes with the desired paste density are prepared by adjusting the amount of polymer and water additions from the solution into the pastes. These pastes can be stored at room temperature in closed containers for up to several weeks without any significant change in crystal structure. Such a process will allow battery manufacturers to switch from one product model to another without wasting active materials and time. Using this process, batteries can be produced in less than 2 days.

The embodiments of the present invention for cureless plate making can be applied to both positive and negative plates of, for example, absorbent glass mats (AGM), or flooded type lead acid batteries. Elimination of the steaming and curing steps for the positive plate reduces the cost to produce the battery by saving the energy cost, labor cost, floor space and battery production time. The present invention further allows battery manufacturers more flexibility and faster response for producing and delivering different models of products to customers. In addition, implementation of the process of the present invention will improve quality control of the lead acid batteries as a result of the increased control of the crystallization and morphology of the paste mixture, which increases consistent reproducibility. Paste density and plasticity due to the polymer addition can be readily controlled and kept consistent, and a porous active mass with uniform pore distribution in the plates can be generated through the polymerization process. By using active materials with optimized crystal structures, the performance and cycling life of the batteries will be optimized.

EXAMPLE

Tetrabasic lead sulfate was synthesized by reacting 70–80% oxidized lead powder with a stoichiometric amount of sulfuric acid in a 50 pound laboratory paste mixer. The mixer cavity includes a double walled water jacket that allows for heating and cooling during the paste mixing process. The mixture was stirred at a fixed rate for 30 minutes with the water jacket temperature set at 90° C. At the end of mixing, samples of the mixtures were taken for free lead content and crystal morphology analysis. The free lead content of the mixed paste was analyzed by using an acetic acid wet chemistry method. About 5% free lead was detected for most of the paste made by using the procedure described above.

Figure 4:
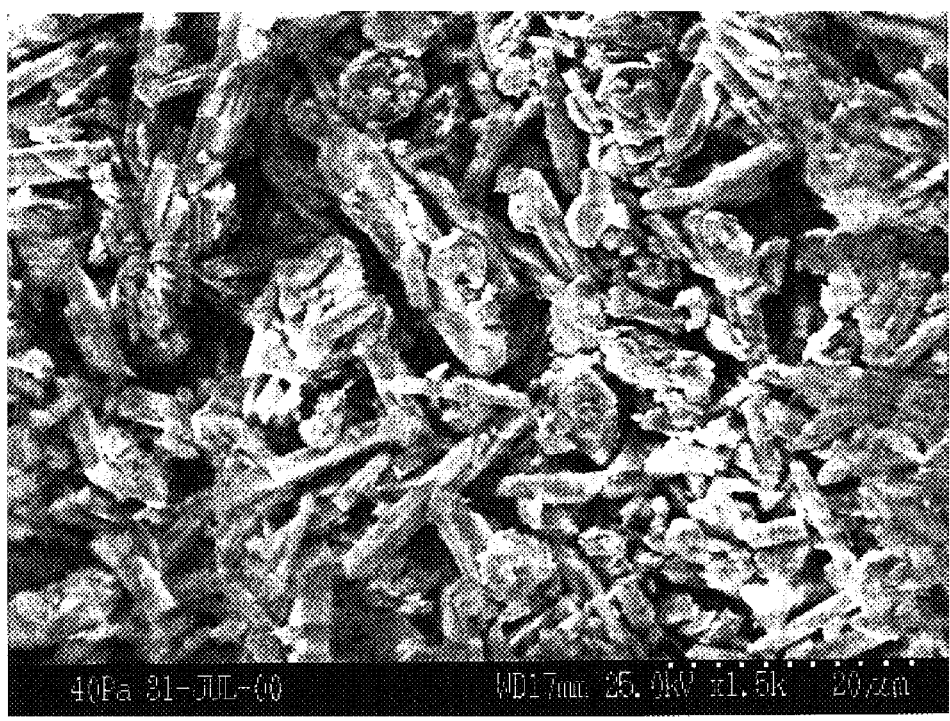
FIG. 4 is a variable pressure scanning electron microscopy (VPSEM) image of the positive paste containing synthesized tetrabasic lead sulfate crystals with average crystal width of 2–3 $\mu$m.

Using x-ray diffraction analysis, measurement of the ratio of the crystal phases in the positive paste, specifically the raw x-ray count of the main tetrabasic peak divided by the main red PbO peak, indicates the formation of a high content of tetrabasic lead sulfate crystals. The morphology of the crystals, as shown by VPSEM imaging in FIG. 4, includes an average needle width of the tetrabasic lead sulfate crystals of about 2–3 $\mu$m, which is preferred for the optimum performance and cycling capability of the positive plates, and an average particle length of about 20 $\mu$m. This paste, however, is difficult to paste onto the grids. The pasted materials are too brittle to handle, and the level of free lead is higher than that in conventional cured plates.

Because of its acid resistance and comparative safety and low cost, polyvinylpyrrolidone (PVP) in both the solid state and liquid state was tested as a binder for the synthesized tetrabasic lead sulfate paste. The PVP was added into the paste after the crystallization phase and the paste stirred for 5 minutes. A significant improvement in the rheological properties of the paste was observed by the addition of PVP. The mixture was then transferred to a conventional paste machine and pasted onto Pb-Ca-Sn grids.

Figure 5A:
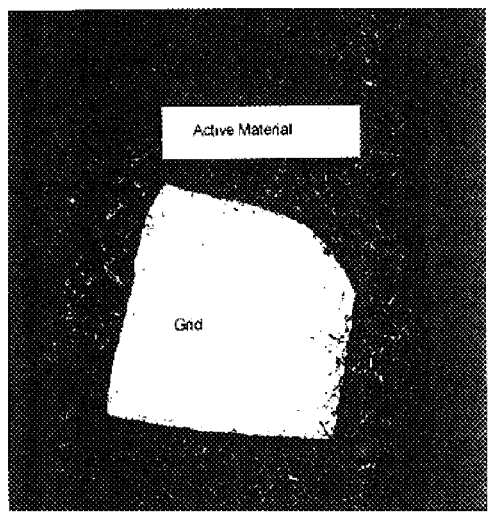
FIGS. 5A and 5B are photographs of the active material and grid interface of a green conventional positive battery plate of the prior art at 50× and 200×magnification, respectively.
Figure 5B:
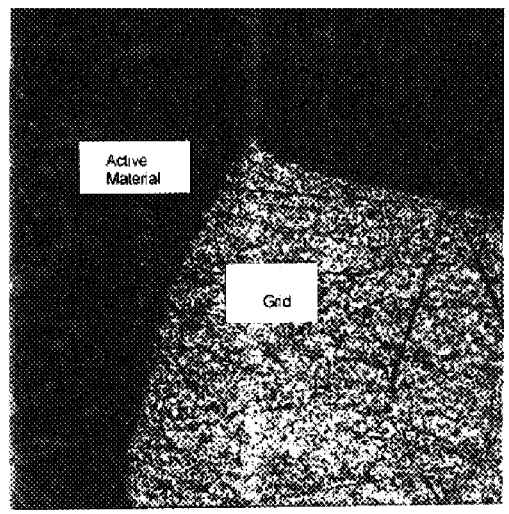
Figure 6A:
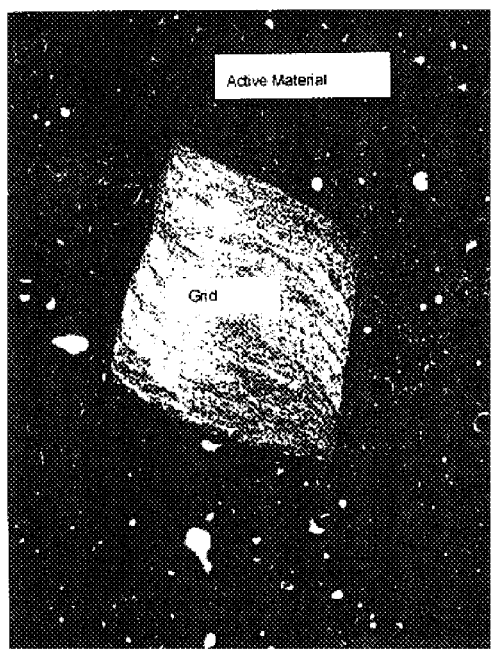
FIGS. 6A and 6B are photographs of the active material and grid interface of a cureless positive battery plate of the present invention at 50× and 200×magnification, respectively.
Figure 6B:
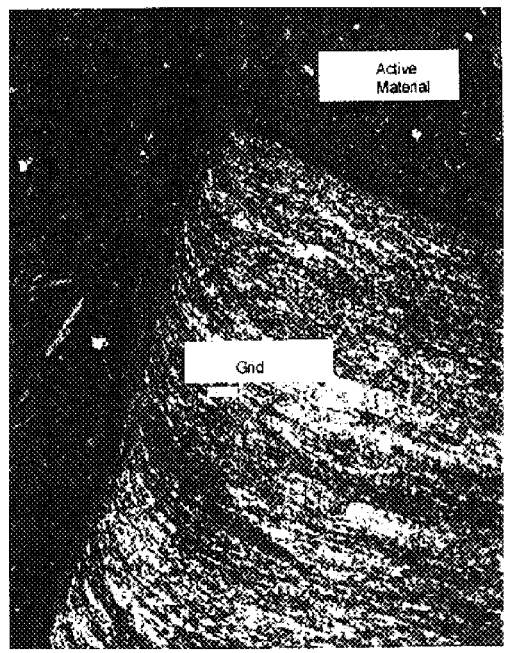

FIGS. 5A and 5B present photographs at 50× and 200× magnification, respectively, of a cross-section of an active material and grid interface from a green conventional positive plate made through steaming and curing processes. FIGS. 6A and 6B present photographs at 50× and 200× magnification, respectively, of a cross-section of an active material and grid interface from a cureless plate with a PVP coating prepared as described above, in accordance with an embodiment of the present invention. At 50×magnification, better particle contacts with more uniform pore distributions in the active materials were observed on the plate of the present invention than on the conventional cured plate. At 200×magnification, the active materials in the plate of the present invention were found to have better adhesion onto the grid surface. The good active material cohesion and active material/grid adhesion are important for long cycling life of lead acid batteries, particularly in high temperature applications.

Figure 7A:
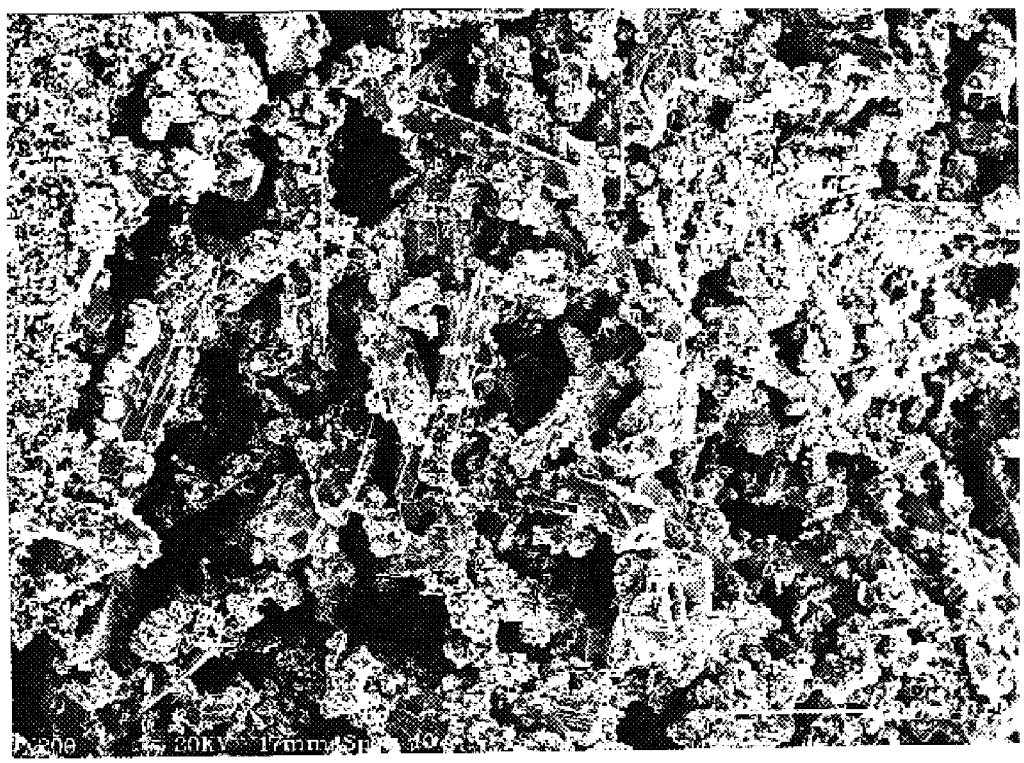
FIG. 7A is a scanning electron microscopy (SEM) image of the positive active materials of a conventional cured plate of the prior art at 200×magnification.
Figure 7B:
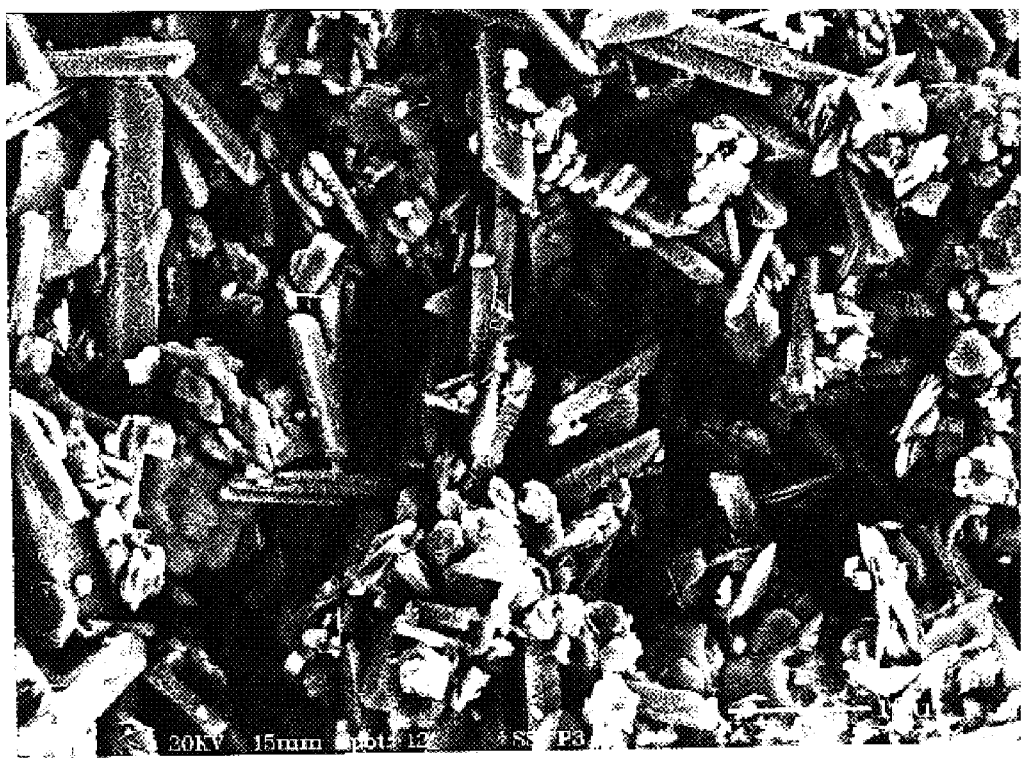
FIG. 7B is an SEM image of the positive active materials of a cureless plate of the present invention at 200× magnification.

FIGS. 7A and 7B present images of active materials by scanning electron microscopy (SEM). While the conventional cured plates rely on the steaming and curing processes to generate the porous skeleton network shown in FIG. 7A at 200×magnification, the cureless plates of the present invention form the porous networks through the water vaporization and polymerization of the polymers as displayed in FIG. 7B at 2000×magnification. The shapes of the needle crystals are similar, but the width and length of the crystals from the cureless plates of the present invention are ten times smaller than those formed from conventional cured plates. The smaller tetrabasic lead sulfate crystals will be easier to convert entirely into lead dioxide during the formation process.

Moreover, less water was needed to achieve the desired plasticity of the paste due to the presence of the polymer. The paste density and plasticity were more consistent and the plate quality more readily controlled. The plates with the polymer addition were found to be very strong such that the active materials were not easily removable from the plates. The plates with the PVP addition also had less cracks in the active mass and were more resistant to fracture due to the "spring" characteristics of the polymer chains. The strength of active material cohesion is characterized by a puncture test that was carried out on Sintech 20D puncture test equipment under a load of 5 lbs. Table 1 summarizes the puncher test results of positive active materials of the cureless plates of the present invention as compared to that of the conventionally produced plates. Again, the cureless plates are demonstrated to be much stronger than the conventional plates.

TABLE 1

| Samples | Peak Load (oz.) | Elongation @ Peak Load (cm) |
|---|---|---|
| Cureless Plate* | 55.42 | 0.230 |
| Cured Plate* | 31.49 | 0.116 |

*Measurements are the average of 3 specimens, each 2.54 × 2.54 × 0.1651 cm³.

Figure 8:
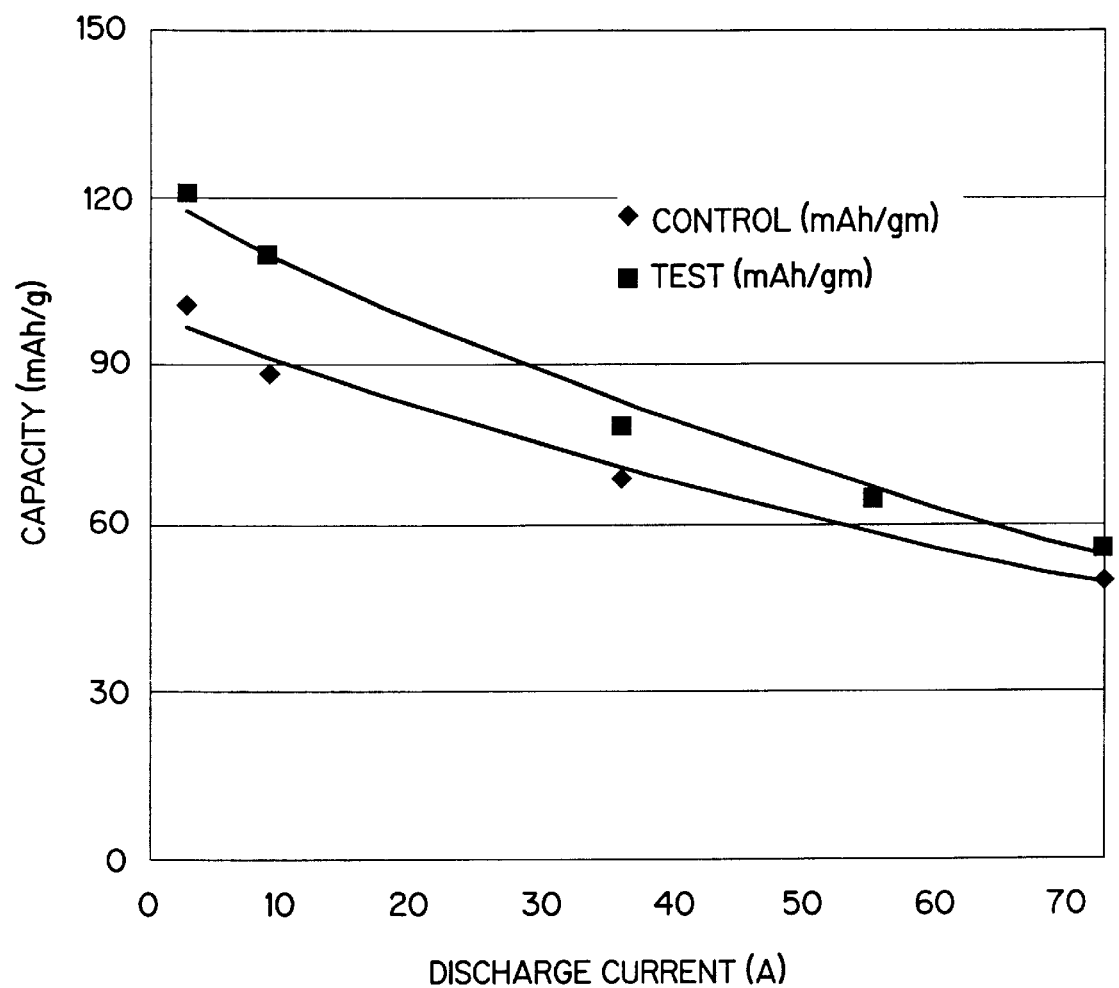
FIG. 8 is a graph showing the capacity per gram (mAh/g) of positive active material for the plates of both the present invention (TEST) and conventional plates (CONTROL), at various discharge currents at room temperature.

The positive cureless plates were assembled between two negative plates, each 0.152 cm thick, and separated by an Entek polyethylene separator. The 3-plate cells were filled with 1.2 s.g. $H_2SO_4$ acid and formed at room temperature for 22 hours. By sulfate and x-ray analysis, over 95% of the positive paste was converted to $PbO_2$. After the formation, the acid in the cell was dumped out and the cell topped in 1.28 s.g. $H_2SO_4$ acid. After standing for 24 hours, a series of high rate and low rate performance tests were performed at room temperature. The capacity per gram of the active material for the plates of the present invention and conventional plates is shown in FIG. 8. The plates of the present invention show much higher active material utilization than the conventional plates over all the discharge rates, which ranged from 1A to 25A.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, polymers other than those specifically identified herein can be used in the present invention where they function to bind crystals in the paste together and/or affect the rheological properties of the paste to enable pasting and drying without crack formation. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A plate making process for a lead acid battery comprising adding a polymer to a paste comprising basic lead sulfate crystals of desired crystal morphology to bind the crystals together and pasting the polymer-containing paste onto a grid where the paste is dried to form a battery plate of the lead acid battery.

2. The process of claim 1, wherein the paste comprises tetrabasic lead sulfate crystals having an average width of about 2–4 μm for forming a positive battery plate.

3. The process of claim 1, wherein the paste comprises tribasic lead sulfate crystals for forming a negative battery plate.

4. The process of claim 1, wherein the paste is stored in a reservoir until ready for pasting.

5. The process of claim 1, wherein the polymer is a hydrophobic polymer selected from the group consisting of: polyolefins, polyvinylchlorides, polyacrylonitriles and polyesters.

6. The process of claim 1, wherein the polymer is a hydrophilic polymer selected from the group consisting of: polyvinylpyrrolidone, polyacrylic acid, polyethylene oxide, polymaleic acid and polystyrenesulfonic acid.

7. The process of claim 1, wherein the paste comprises about 15–50% sulfate and up to about 20% red lead.

8. The process of claim 7, wherein the paste comprises about 10–20% red lead.

9. A plate making process for a lead acid battery, the process comprising:
    mixing and reacting an oxidized lead powder, water and sulfuric acid in a closed reactor to produce a paste comprising basic lead sulfate crystals;
    adding a polymer to the paste to bind the crystals together;
    pasting the polymer-containing paste onto a grid where the paste is dried to form a battery plate of the lead acid battery.

10. The process of claim 9, wherein the mixing and reacting is at an elevated temperature of at least about 70° C. to produce tetrabasic lead sulfate crystals for forming a positive battery plate.

11. The process of claim 10, wherein the tetrabasic lead sulfate crystals have an average width of about 2–4 μm.

12. The process of claim 9, wherein the mixing and reacting is at a temperature between ambient and about 80° C. to produce tribasic lead sulfate crystals for forming a negative battery plate.

13. The process of claim 9 further comprising adding a surfactant to the paste.

14. The process of claim 13, wherein the surfactant is a lignosulfonate.

15. The process of claim 9, wherein the polymer is a hydrophobic polymer selected from the group consisting of: polyolefins, polyvinylchlorides, polyacrylonitriles and polyesters.

16. The process of claim 9, wherein the polymer is a hydrophilic polymer selected from the group consisting of: polyvinylpyrrolidone, polyacrylic acid, polyethylene oxide, polymaleic acid and polystyrenesulfonic acid.

17. The process of claim 9, wherein the mixing, reacting and adding occur in a closed extrusion apparatus, and pasting occurs by extruding the paste from the apparatus onto the grid.

18. The process of claim 9, wherein the mixing, reacting and adding occur in a closed mixing apparatus having a double walled jacket for controlling a temperature within the reactor.

19. The process of claim 9, wherein the paste produced has a sulfate content of about 15–50% and up to 20% red lead.

20. The process of claim 19, wherein the paste produced contains about 10–20% red lead.

21. A plate making process for a lead acid battery, the process comprising:
    mixing and reacting an oxidized lead powder, water and sulfuric acid in a closed reactor at a temperature of at least about 70° C. to produce a paste comprising basic lead sulfate crystals having an average width of about 2–4 μm;
    adding a polymer to the paste to bind the crystals together;
    pasting the polymer-containing paste onto a grid where the paste is dried to form a positive battery plate of the lead acid battery.

22. The process of claim 21 further comprising adding a surfactant to the paste.

23. The process of claim 22, wherein the surfactant is a lignosulfonate.

24. The process of claim 21, wherein the polymer is a hydrophobic polymer selected from the group consisting of: polyolefins, polyvinylchlorides, polyacrylonitriles and polyesters.

25. The process of claim 21, wherein the polymer is a hydrophilic polymer selected from the group consisting of:

polyvinylpyrrolidone, polyacrylic acid, polyethylene oxide, polymaleic acid and polystyrenesulfonic acid.

26. The process of claim 21, wherein the mixing, reacting and adding occur in a closed extrusion apparatus, and pasting occurs by extruding the paste from the apparatus onto the grid.

27. The process of claim 21, wherein the mixing, reacting and adding occur in a closed mixing apparatus having a double walled jacket for controlling the temperature within the reactor.

28. The process of claim 21, wherein the paste produced has a sulfate content of about 15–50% and up to 20% red lead.

29. The process of claim 28, wherein the paste produced contains about 10–20% red lead.

30. A plate making process for a lead acid battery, the process comprising:

mixing and reacting an oxidized lead powder, water and sulfuric acid in a closed reactor at an elevated temperature to produce a first paste comprising tetrabasic lead sulfate crystals having an average width of about 2–4 $\mu$m;

mixing and reacting an oxidized lead powder, water and sulfuric acid in a closed reactor at a temperature between ambient and about 70° C. to produce a second paste comprising tribasic lead sulfate crystals;

adding a polymer to each of the first and second pastes to bind the crystals together;

pasting the polymer-containing first paste onto a first grid where the paste is dried to form a positive battery plate of the lead acid battery;

pasting the polymer-containing second paste onto a second grid where the paste is dried to form a negative battery plate of the lead acid battery;

assembling the positive and negative battery plates and converting the tetrabasic lead sulfate to lead dioxide.

31. The process of claim 30 further comprising adding a surfactant to each of the first and second pastes.

32. The process of claim 31, wherein the surfactant is a lignosulfonate.

33. The process of claim 30, wherein the polymer is a hydrophobic polymer selected from the group consisting of: polyolefins, polyvinylchlorides, polyacrylonitriles and polyesters.

34. The process of claim 30, wherein the polymer is a hydrophilic polymer selected from the group consisting of: polyvinylpyrrolidone, polyacrylic acid, polyethylene oxide, polymaleic acid and polystyrenesulfonic acid.

35. The process of claim 30, wherein the mixing, reacting and adding occur in a closed extrusion apparatus, and pasting occurs by extruding the paste from the apparatus onto the grid.

36. The process of claim 30, wherein the mixing, reacting and adding occur in a closed mixing apparatus having a double walled jacket for controlling the temperature within the reactor.

\* \* \* \* \*